United States Patent [19]

Aine

[11] 4,181,986
[45] Jan. 8, 1980

[54] METHOD OF COVERING AND UNCOVERING A SWIMMING POOL

[76] Inventor: Harry E. Aine, 30600 Page Mill Rd., Los Altos, Calif. 94022

[21] Appl. No.: 613,443

[22] Filed: Sep. 15, 1975

Related U.S. Application Data

[60] Division of Ser. No. 516,204, Oct. 21, 1974, Pat. No. 3,927,427, which is a continuation-in-part of Ser. No. 367,198, Jun. 5, 1973, abandoned.

[51] Int. Cl.² .......................... E04H 3/16; E04H 3/18
[52] U.S. Cl. ................................ 4/172.14; 4/172.13; 4/172.12
[58] Field of Search .................. 4/172, 172.12, 172.13, 4/172.11, 172.14, 1

[56] References Cited

U.S. PATENT DOCUMENTS

| | | | |
|---|---|---|---|
| 2,928,103 | 3/1960 | Turner | 4/172.13 |
| 2,970,320 | 2/1961 | Karp | 4/172.13 |
| 3,801,994 | 4/1974 | Brown | 4/172.12 |
| 3,813,704 | 6/1974 | Troiano | 4/172.13 |
| 3,916,457 | 11/1975 | Morita | 4/172.12 |

Primary Examiner—Henry K. Artis
Attorney, Agent, or Firm—Harry E. Aine; Harvey G. Lowhurst

[57] ABSTRACT

A thermally insulative buoyant swimming pool cover floats on the surface of the pool for covering the pool and for retaining the heat within the pool. Sinking means, such as weights or a mechanical pull-down structure, is secured to the pool cover along certain predetermined action lines such as fold lines. In one embodiment, an inflatable and deflatable bladder is coupled to the weights. The bladder is dimensioned relative to the weights such that when inflated it overcomes the negative buoyancy of the weights to retain the pool cover in the fully covered position. However, when the bladder is deflated, the weights overcome the positive buoyancy of the cover along the certain fold lines causing the cover to be at least partially pulled below the surface of the pool and folded while at the same time being retracted against one of the side walls of the pool. Pool water is circulated over or through channels of the pool cover to provide solar heating. Pool water is circulated over the top of the cover for cleaning thereof. The weights are preferably hollow to receive the inflatable bladders. Air permeable structures are contained within the bladders to obtain more uniform inflation thereof. The lip of the cover contains additional positive buoyancy for additional support at the lip.

2 Claims, 26 Drawing Figures

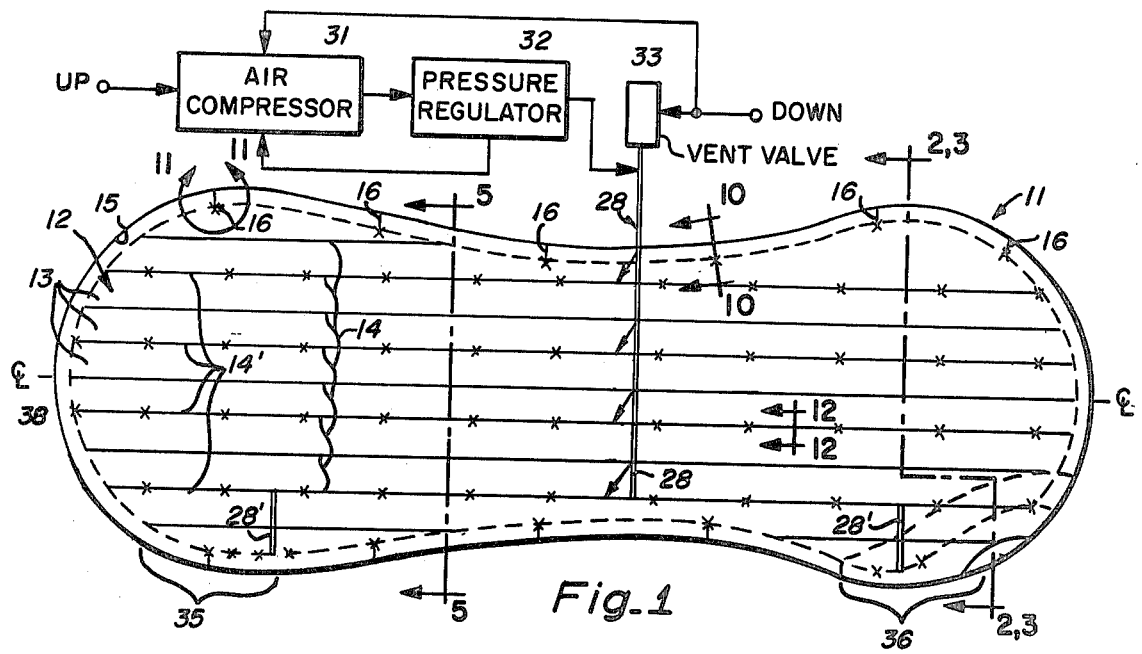
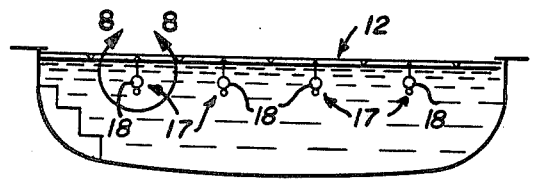
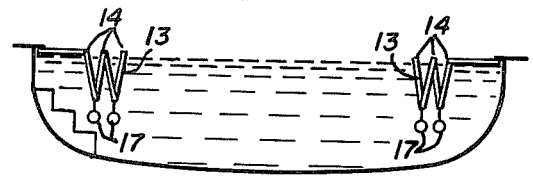
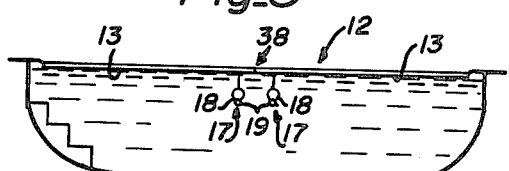
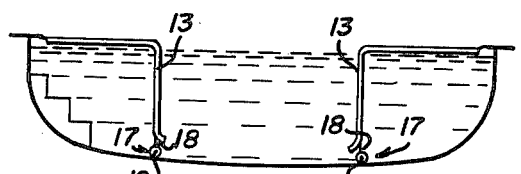
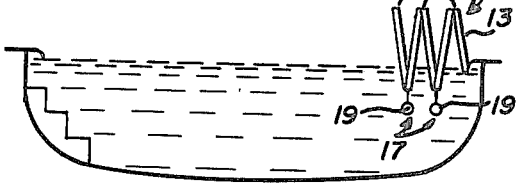
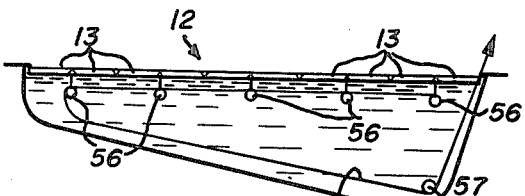
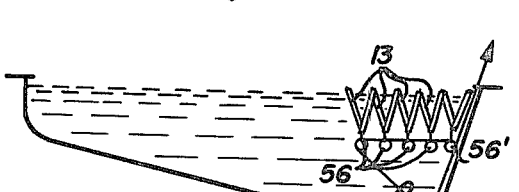

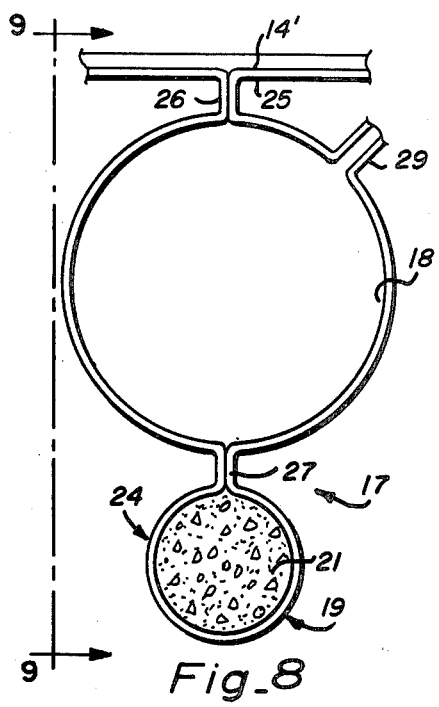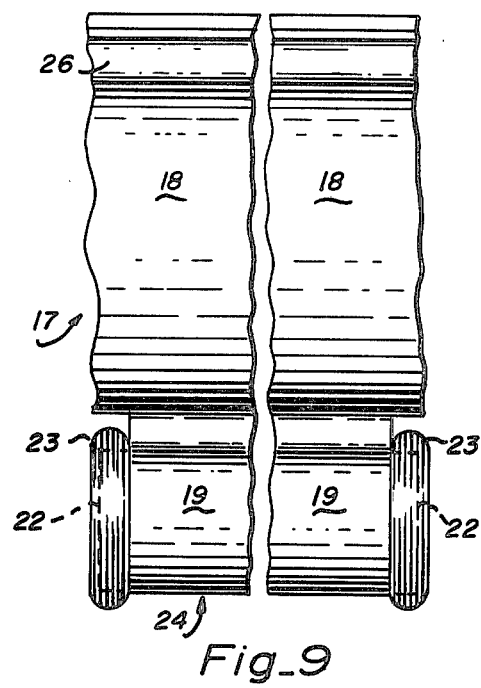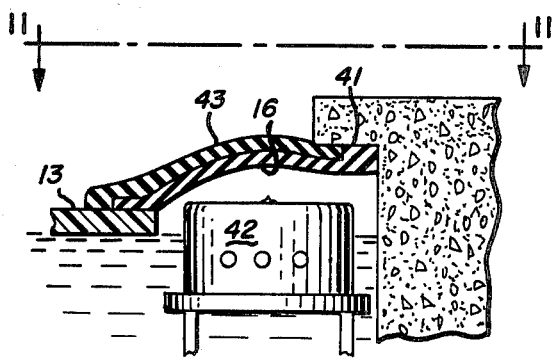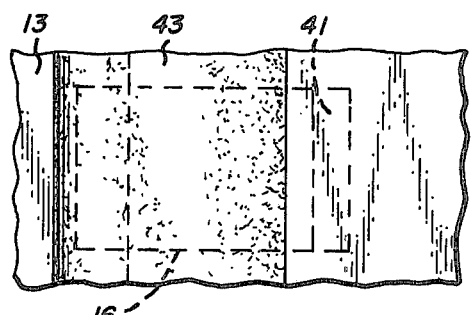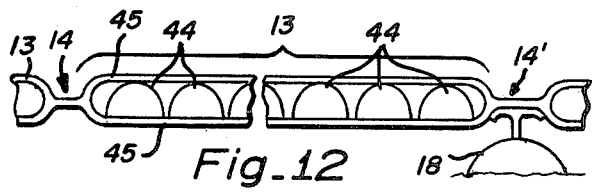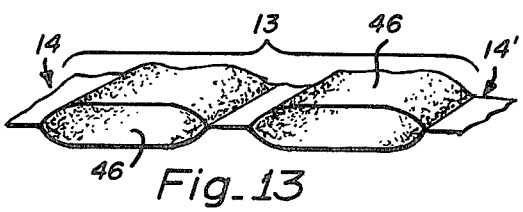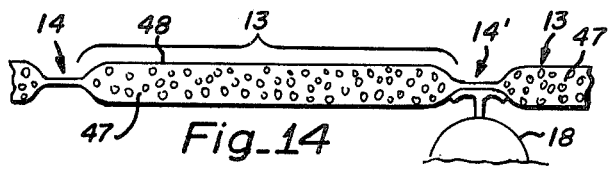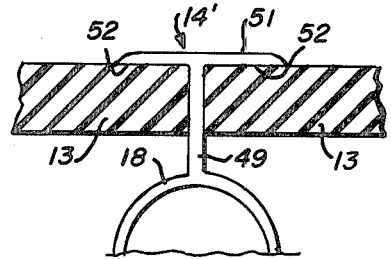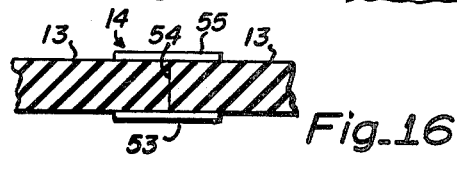

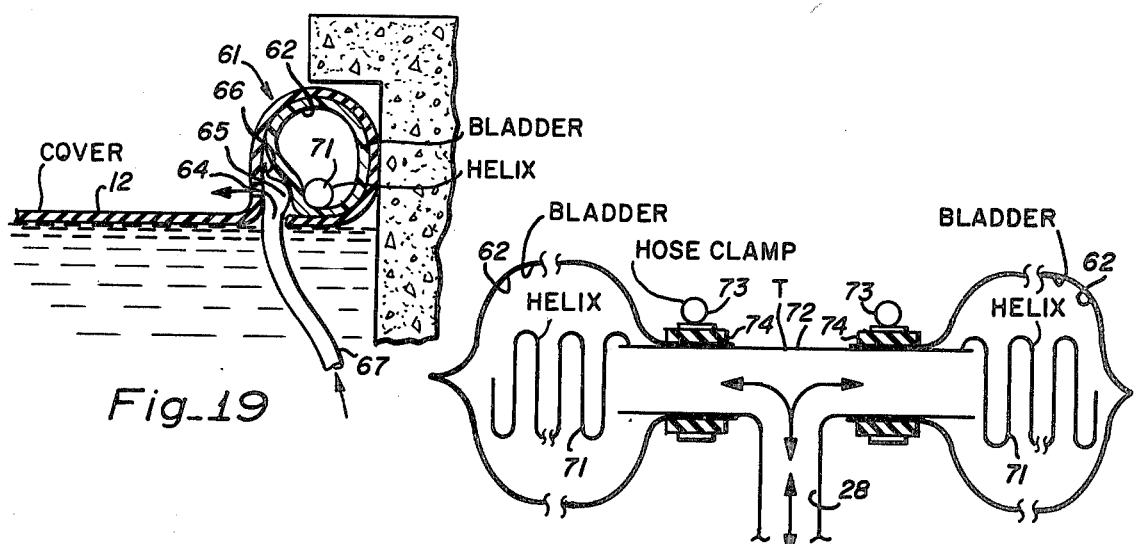
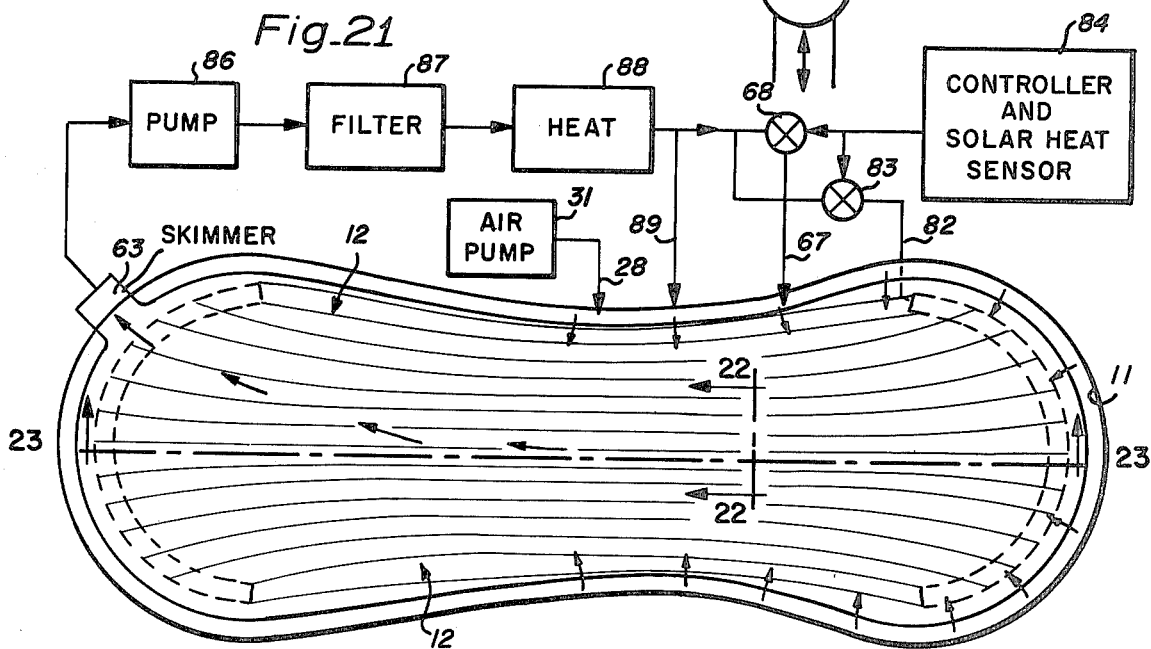
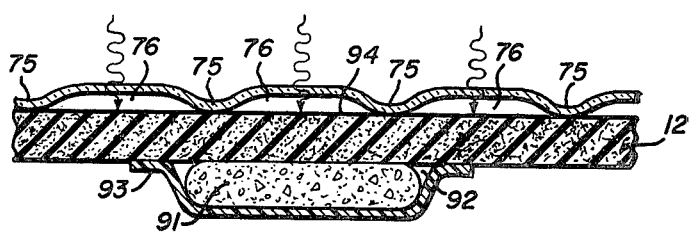

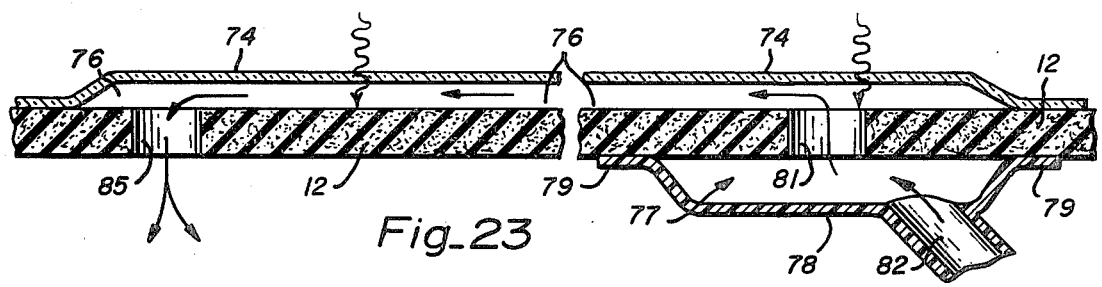
Fig_23
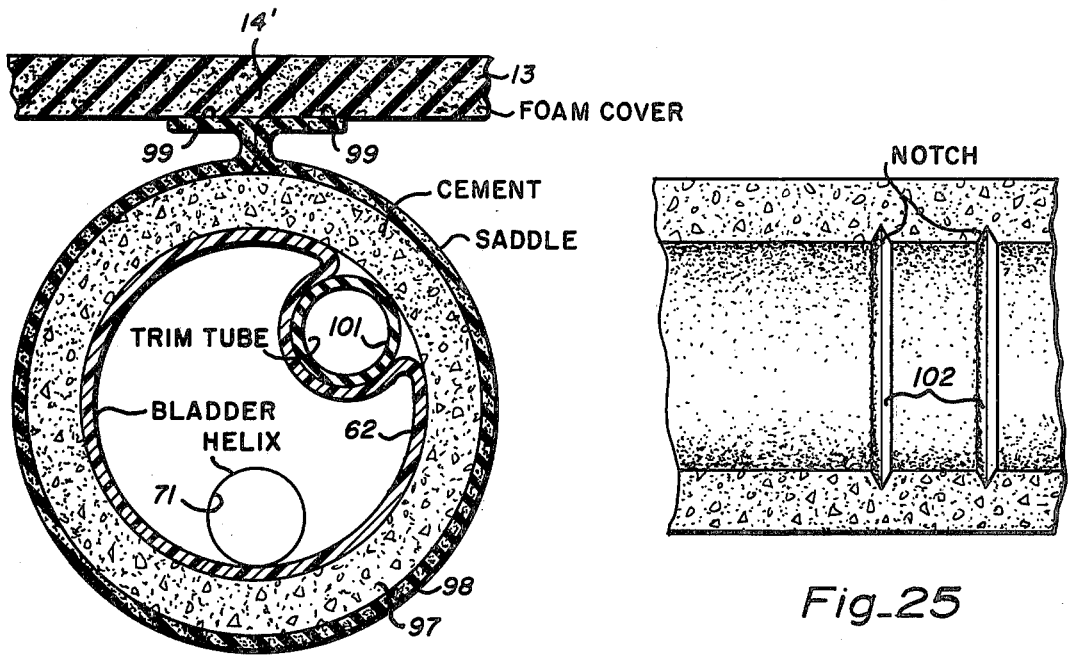
Fig_24
Fig_25
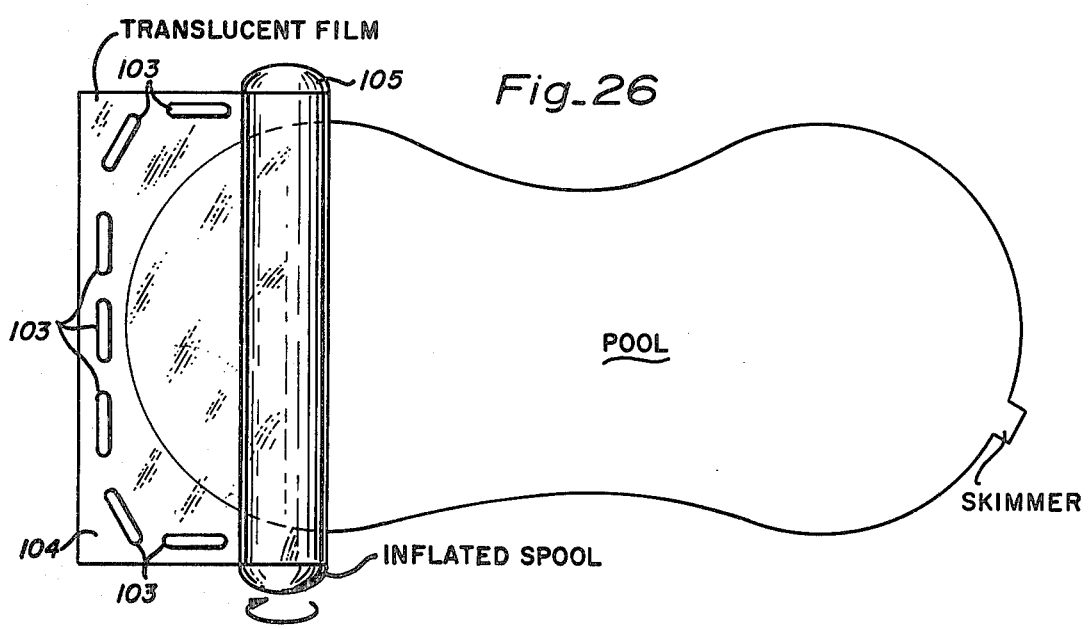
Fig_26

METHOD OF COVERING AND UNCOVERING A SWIMMING POOL

This is a division of application Ser. No. 516,204, filed Oct. 21, 1974 now U.S. Pat No. 3,927,427 which in turn is a continuation-in-part application of U.S. Ser. No. 367,198 filed June 5, 1973, now abandoned.

DESCRIPTION OF THE PRIOR ART

Heretofore, buoyant thermally insulative pool covers have been proposed for covering a swimming pool and for retaining the heat within the pool. Such pool covers are disclosed in U.S. Pat. Nos.: 3,683,428 issued Aug. 15, 1972; U.S. Pat. No. 3,405,410 issued Oct. 15, 1968; U.S. Pat. No. 3,528,110 issued Sept. 15, 1970; and U.S. Pat. No. 3,072,920 issued Jan. 15, 1963.

Some of these prior art covers use a rigid plastic foam such as polystyrene made up in a number of segments joined together along adjacent seams or laced together by means of flexible hinges.

Such prior covers, both of the rigid and flexible types, are very effective in retaining the heat within the pool. However, they are extremely clumsy and difficult to remove for opening the pool for swimming. Opening the pool for swimming requires that the individual segments in the case of a segmented cover be removed by hand and set aside on the pool bank. This is a relatively time consuming and tedious operation. It must be repeated each time the pool is to be used. Moreover the prior art floating covers extend substantially to the sidewall of the pool in such a manner as to prohibit use of a self-propelled automatic pool cleaning device such as the conventional pool sweep cleaner marketed by Arneson Products.

SUMMARY OF THE PRESENT INVENTION

The principal object of the present invention is the provision of an improved swimming pool cover.

In one feature of the present invention, sinking means are operatively coupled to the buoyant thermally insulative pool cover along at least one predetermined action line for selectively sinking, when actuated, at least a portion of the cover along the action line to cause the cover to be folded within the pool, thereby opening a region of the pool for swimming.

In another feature of the present invention, a cover sinking means which is coupled to the pool cover along certain predetermined action lines for folding the cover within the pool consists of an inflatable bladder coupled to a weight structure such that by inflation of the bladder the negative buoyancy of the weight can be overcome to cause the positive buoyancy of the cover to prevail, whereby the cover is retained in the fully extended position on the surface of the pool, but upon deflation of the bladder the negative buoyancy of the weights overcomes at least a portion of the positive buoyancy of the cover along certain predetermined action lines to cause the cover to be folded and retracted to one side for opening the pool for swimming.

In another feature of the present invention, the buoyant thermally insulative pool cover includes a part line extending lengthwise of the pool generally down the center thereof, sinking means are coupled to each half of the parted cover generally near the part line such that upon sinking of the marginal edge of the cover along the part line the cover is retracted toward the sides of the pool leaving a clear center lane for swimming.

In another feature of the present invention, the floating pool cover is tethered along one side and untethered along the other side with sinking means extending along certain action lines running longitudinally of the cover, such that upon actuation of the sinking means the cover tends to fold and to be retracted toward the tethered side edge of the cover, thereby opening a region of the pool for swimming.

In another feature of the present invention, spacer means are provided along the periphery of the cover for spacing the side edge of the floating cover from the side wall of the pool by an amount greater than 10 inches to permit a conventional self-propelled cleaning buoy to pass between the edge of the cover and the side wall of the pool, whereby the pool is automatically cleaned with the cover in place.

In another feature of the present invention, the buoyant thermally insulative cover is translucent such that the cover has a minimum detracting effect upon the asthetic appearance of the pool, particularly at night when the pool is lighted from within.

In another feature of the present invention a laterally extending inflatable and deflatable member is coupled to the cover to aid in extending the cover when inflated.

In another feature of the present invention, pool water is circulated over the pool cover or through channels of the pool cover to provide solar heating.

In another feature of the present invention, pool water is circulated over the top of the cover for cleaning thereof.

In another feature of the present invention, the lip of the cover contains additional positive buoyancy relative to the central region of the cover for providing additional support at the lip.

In another feature of the present invention, the negative buoyancy weights are preferably hollow to receive the inflatable bladders, whereby dimensioning of the bladders for neutral buoyancy is made less critical, the overall size of the negative buoyancy structure is decreased, and whereby the bladder is protected from inadvertent abrasion and damage.

In another feature of the present invention, air permeable structures are contained within the bladders to obtain more uniform inflation thereof.

In another feature of the present invention an inflatable spool is provided for handling a translucent sheet of material over the pool for making a template of the pool cover as an aid in fabrication of the pool cover.

Other features and advantages of the present invention will become apparent upon a perusal of the following specification taken in connection with the accompanying drawings wherein:

BRIEF DESCRIPTION OF THE DRAWINGS

FIG. 1 is a plan view, partly in schematic block diagram form, of a swimming pool employing the cover of the present invention, FIG. 2 is a sectional view of the structure of FIG. 1 taken along line 2—2 in the direction of the arrows with the pool cover in the extended position, FIG. 3 is a view similar to that of FIG. 2 showing the pool cover in the collapsed or retracted state for uncovering a region of the pool for swimming, FIG. 4 is a view similar to that of FIG. 3 depicting an alternative embodiment of the present invention, FIG. 5 is a transverse sectional view of the pool of FIG. 1 taken along line 5—5 in the direction of the arrows and depicting an alternative embodiment of the present invention with the pool cover in the extended position, FIG. 6 is a view similar to that of FIG. 5 depicting the cover in the retracted or folded state for opening central region of the pool for swimming, FIG. 7 is a view similar to that of FIG. 6 depicting an alternative embodiment of the present invention wherein the pool cover is made of rigid foam panels and depicting the cover in the retracted state for uncovering a region of the pool for swimming, FIG. 8 is an enlarged sectional view of a portion of the structure of FIG. 2 delineated by line 8—8.

FIG. 9 is a foreshortened side elevational view of the structure of FIG. 8 taken along line 9—9 in the direction of the arrows, FIG. 10 is an enlarged sectional view of a portion of the structure of FIG. 1 taken along line 10—10 in the direction of the arrows, FIG. 11 is a plan view of a portion of the structure of FIG. 10 taken along line 11—11 in the direction of the arrows, FIG. 12 is an enlarged sectional view of a portion of the structure of FIG. 1 taken along line 12—12 in the direction of the arrows, FIG. 13 is a view similar to that of FIG. 12 depicting an alternative cover embodiment of the present invention, FIG. 14 is a view similar to that of FIGS. 12 and 13 depicting an alternative cover embodiment of the present invention, FIG. 15 is a view similar to that of 12–14 depicting an alternative rigid foam cover embodiment of the present invention of the type used in FIG. 7, FIG. 16 is a transverse sectional view through a hinged joint in panels of the type utilized in FIGS. 15 and 7, FIG. 17 is a longitudinal sectional view of a swimming pool cover with an alternative mechanical structure for retracting the cover, FIG. 18 is a view similar to that of FIG. 17 depicting the cover in the partially retracted state, FIG. 19 is an enlarged detail cross-sectional view of a portion of the structure of FIG. 2 delineated by line 19—19 and depicting a buoyant lip portion of the cover, as employed in an alternative embodiment of the present invention, FIG. 20 is a schematic line diagram of an inflatable bladder of the present invention, FIG. 21 is a plan view, partly in block diagram form, of a pool covered by the cover of FIG. 19, FIG. 22 is an enlarged sectional view of a portion of the structure of FIG. 21 taken along the line 22—22 in the direction of the arrows, FIG. 23 is an enlarged sectional view of a portion of the structure of FIG. 21 taken along line 23—23 in the direction of the arrows, FIG. 24 is a view similar to that of FIG. 8 depicting an alternative embodiment of the present invention, FIG. 25 is a longitudinal sectional view of a weight incorporating features of the present invention, and FIG. 26 is a schematic plan view of a pool depicting a method for making a pool cover template incorporating features of the present invention.

DESCRIPTION OF THE PREFERRED EMBODIMENTS

Referring now to FIG. 1, there is shown a free foam shaped swimming pool 11 having a thermally insulative swimming pool cover 12 floating upon the surface thereof.

The swimming pool cover 12 has a net positive buoyancy in the extended position for covering the pool and may comprise any one of a number of different structures to be more fully disclosed below with regard to FIGS. 12–16. In one embodiment, the cover 12 comprises a plurality of elongated parallel panels 13 with adjacent ones of the panels 13 being joined together by means of hinge-type seams or joints 14.

In a preferred embodiment, the panels 13 terminate approximately 1 foot from the adjacent side edge 15 of the pool 11 such that a one-foot margin is provided around the entire perimeter of the cover 12. In this manner, a self-propelled pool cleaner such as the Arneson pool sweep may travel around the perimeter of the cover in the marginal space between the pool edge 15 and the adjacent edge of the floating panels 13.

The swimming pool cover 12 is tethered to one side edge 15 of the pool 11 via the intermediary of a plurality of arch shaped resilient spacer members 16, more fully described below with regard to FIGS. 10 and 11. These spacer members 16 are joined at one end to the panels 13 and at the other end to the lip of the pool in order to provide the proper spacing from the edge of the pool to the panels 13 and to prevent longitudinal or lateral translation of the pool cover 12 relative to the side wall 15 of the pool in order to maintain the marginal clearance for the pool sweep.

Alternate ones of the hinge joints 14' between adjacent panels 13, as indicated by the "X" marks along the hinge lines 14', are coupled to sinking means 17 as shown in FIGS. 2, 8 and 9. The sinking means comprises a tubular inflatable bladder portion 18 with a dependent weight portion 19. The weight portion 19 includes a suitable ballast material 21, as of portland cement, sand, gravel, or the like, chosen to provide a predetermined negative buoyancy for sinking a certain predetermined portion of the pool cover 12. In a preferred embodiment, the ballast 21 comprises a plurality of concrete cylinders 22 each being approximately 1 foot in length and provided with rubber or plastic end caps 23 to prevent scarring, denting or scraping of the bottom or sides of the pool. The cylinders 22 are retained within loop portions 24 dependent from the bladder 18. The bladder 18 is dimensioned to provide a sufficient positive buoyancy taken together with the positive buoyancy of the certain portions of the cover 12 to overcome the negative buoyancy of the weight 21 when the bladder is inflated with air.

The sinking structure is affixed to the hinge 14' as by adhesive, heat sealing, stitching or the like. An upper flange portion 25 of the bladder is affixed to the underside of the hinge portion 14'. In a typical example, the bladder 18 is made of 0.020" thick clear polyvinylchloride plastic. The bladder 18 is readily fabricated by folding a sheet of plastic over on itself and forming two longitudinal seams 26 and 27 to define the inflatable bladder 18 and the dependent loop portions 24, the latter being formed by slicing the lower tube portion between seam 27 and the fold. The ends of the tube 18 are closed as by heat sealing or RF sealing such that an airtight structure is obtained.

Referring again to FIG. 1, the bladders 18 are inflated and deflated by means of tubulation 28 connected into each of the bladders 18 via suitable gastight fittings 29. Air for inflating the bladders 18 is derived from an air compressor 31 via a pressure regulator 32 set for a suitable maximum pressure as of +5 PSI. A solenoid operated vent valve 33 is connected to line 28.

In operation, the cover 12 is positioned in its extended (covering state) by actuation of the air compressor 31 by means of an up command, such as by switching an electrical switch for supplying electrical energy to the compressor. The air compressor 31 supplies air at a suitable pressure as of 5 PSI to each of the inflation bladders 18 such that the negative buoyancy of the weight structure 19 is overcome and the positive buoyancy of the cover 12 prevails to allow the cover 12 to float on the surface of the pool. When it is desired to uncover the pool, an electrical switch is thrown that actuates the solenoid valve 33 to open the valve and to vent the tubulation 28 to the atmosphere. The down command also switches off the air compressor 31.

As the air escapes from the bladders 18 and they deflate, the negative buoyancy of the ballast 21 takes over and causes the cover 12 to partially sink along action or fold lines 14'. Due to the fact that the cover 12 is tethered along one side edge of the pool and untethered at the opposite side edge and along the ends, the cover 12 tends to fold and to be retracted toward the tethered side of the pool as shown in FIG. 3. This serves to uncover a substantial region of the pool extending for the full length of the pool for swimming.

The negative buoyancy required for the sinking structure 17 is only that required to overcome the positive buoyancy of portions of the panels 13 disposed on adjacent sides of the action line 14'. This negative buoyancy need not overcome the entire positive buoyancy of the panels 13 on opposite sides of the respective action line 14' as, in a preferred embodiment, a portion of the cover 12, namely, the intervening hinge lines 14, remains on or slightly above the surface of the pool.

In the particular pool shown in FIG. 1, due to the outwardly bulging portions of the pool and thus the cover 12 in regions 35 and 36, auxiliary sinking means are provided essentially at the marginal edge of the cover 12 in regions 35 and 36 for sinking these outwardly extending portions of the cover 12. These auxiliary sinking means, of the same type as used elsewhere in the cover 12, have their bladders 18 connected in gas communication with the main tubulation 28 via the longitudinally directed bladder 18 and lateral auxiliary sections of tubulation 28'.

Tubulation 28 and 28' is preferably flexible and relatively large in diameter as of 2-3 inches and extends laterally of the cover 12 below the surface of the cover 12. The lateral tubing 28 is fixedly secured to each of the longitudinal bladders 18 such that the lateral tubing when inflated serves as a ram for laterally extending the cover 12 over the surface of the pool. The lateral tubing 28 and 28' is preferably weighted to sink when deflated such as not to be caught in the folds of the cover 12. That portion of tubulating 28 extending between the air compressor and pool edge need not be as large in diameter, as of ½ to 1", and may actually comprise a pressurized vacuum line often provided between the pool equipment pad and the pool.

Referring now to FIG. 4, there is shown an alternative embodiment of the cover 12 of FIG. 1 wherein the cover is provided with a longitudinal center part line 38 such that the cover 12 is divided into two halves. In this case the actuating tubulation 28 would include one length laterally connected into the bladders or bladder of one half of the cover 12 and a second branch of the tubulation, which would extend around the lip of the pool underneath the overhang is connected in gas communication with the bladder or bladders 18 of the second half of the cover 12. The cover 12 in the extended position appears as shown in FIG. 2 and in the open state appears as shown in FIG. 4 wherein each half of the cover is retracted toward its respective side wall. In this case, the cover 12 is also tethered along both side walls.

Referring now to FIGS. 5 and 6 there is shown an alternative embodiment of the present invention. In the embodiment of FIGS. 5 and 6, the swimming pool cover 12 includes the longitudinally directed center part line 38 dividing the cover 12 into two halves. The sinking means 17 includes two sinking structures extending longitudinally of the pool cover 12 adjacent to and parallel to the part line 38, except at the shallow end of the pool the sinking structures may, if desired, diverge for folding the cover in the shallow end in a manner similar to that shown in FIG. 4. When the bladder portion 18 of the sinking means structure 17 is fully inflated to overcome the negative buoyancy of the ballast portion 19, the cover is in the fully extended position as shown in FIG. 5. When the bladders 18 are deflated the negative buoyancy of the ballast takes over to fold under so much of the panels 13 as determined by the amount of negative ballast. In the shallow end of the pool it is desired to uncover a lane wider than approximately 6 feet, the sinking means 17 can move away from the parting line 38 toward the respective adjacent side walls of the pool by an amount equal to approximately the depth of the shallow end of the pool such that the width of the lane opened up would be approximately equal to four times the depth of the pool. In the case of a three-foot depth at the shallow end, this would correspond to a swimming lane width of 12 feet. Auxiliary lateral part lines with corresponding lateral sinking means can be provided for uncovering steps, ladders and the like.

Referring now to FIG. 7, there is shown an alternative embodiment of the present invention wherein the pool cover 12 is formed of rigid panels 13, as of polystyrene plastic foam. In this embodiment the negative ballast 19 of the sinking means 17 needs only to be sufficient to sink a portion of the plastic foam panels 13. As the negative ballast takes over upon deflation of the bladders 18, the hinged panels 13 tilt up as shown in FIG. 7 and the structure folds toward the tethered edge of the pool cover 12. Use of the rigid plastic foam panels 13 as shown in FIG. 7 is not limited to the case where the cover 12 is tethered along only one side. As an alternative the rigid panels may be utilized in the embodiment as shown in FIG. 4 where a part line is provided centrally of the pool and the two halves of the cover are retracted toward opposite sides of the pool.

Referring now to FIGS. 10 and 11 there is shown, in greater detail, the tethering structure 16 for tethering the cover 13 to the side edge of the pool. More particularly, the tethering structure 16 comprises a resilient arched member 16, as of rubber or plastic, which is joined at one end as by adhesive to the underside of the cantilevered deck at 41 and similarly joined to the edge of one of the panels 13 of the pool cover 12 for spacing the cover from the side wall of the pool by an amount sufficient to allow the self-propelled pool cleaning device to circulate around the perimeter of the cover 12. The conventional buoy 42 of the pool cleaning device requires more than 10 inches of clearance between the edge of the cover and the side wall of the pool. A thermally insulative flap 43 is sealed to the cover 13 and is supported upon the arch shaped members 16 for closing off the region between the lip of the pool and the marginal lip of the adjacent panel 13. In the untethered marginal region of the cover 13, the resilient arch shaped members 16 are provided but they are not sealed to the lip of the pool structure however they do serve as arch shaped supports for the marginal flap portion 43 and as spacers for the marginal edges of the panels 13. In some embodiments the cover 12, at the margin, may be of sufficient light weight to allow the pool sweep to pass thereunder by the self-propelled buoy 42 lifting of the cover or flap portion of the cover.

Referring now to FIG. 12, there is shown, in cross section a preferred panel structure 13 of the present invention. In the panel 13 of FIG. 12, the panel is flexible and comprises a strip of plastic bubbles 44 captured in a plastic sheet, as of polyethylene. In a typical example the bubbles 44 are ½ of an inch in diameter and ⅜ of an inch in height and are provided in a closely packed array in a plastic sheet captured between a pair of clear vinyl sheets 45, as of 0.010 inch thick clear ultra violet resistant polyvinyl-chloride sheet material. The vinyl sheets 45 are sealed together as by RF sealing at the periphery of the panels 13 to provide transparent envelopes for each of the panel sections 13. Adjacent panel sections 13 are sealed together at their mating flange portions to provide the action hinge 14'. The inflatable bladder 18 with dependent ballast 19 is affixed to the underside of the hinged portion 14', as by a suitable adhesive or RF sealing.

The captured bubbles 44 serve to space the two sheets 45 and to provide buoyancy for the panels 13. In addition the air cap or bubble material 44 is translucent and made of a clear material such that a substantial amount of the sun's energy may pass through the panel 13 into the pool for absorption therein to provide solar heating of the pool during the daylight hours. Moreover, the translucent and near transparent appearance of the panels 13 of FIG. 12 provides a minimum of disturbance to the asthetic appearance of the pool. This is particularly true at night with the pool lighted from within.

Referring now to FIG. 13 there is shown an alternative panel structure 13 of the present invention. More particularly, in the embodiment of FIG. 13, the pool cover 12 is formed by a pair of clear polyvinyl-chloride sheets 46 as of 0.010 inch thick clear polyvinyl-chloride sealed together as by RF sealing techniques in a grid or waffle configuration defining a multiplicity of air pockets as of 3 to 18" on a side in the composite panels 13. The advantage of the quilted or waffle cover structure of FIG. 13 is that it is nearly totally transparent to the sun's rays in the visible range while providing substantial thermal insulation.

Referring now to FIG. 14, there is shown an alternative flexible pool cover panel structure 13. More particularly, in the pool cover panel structure of FIG. 14, each panel is formed of a flexible plastic foam sheet 47 which may be of the open cell or closed cell foam type captured between two sheets of polyvinyl-chloride material, as of 0.010 inch thickness and preferably colored light blue. The sheets 48 are sealed at the periphery of the foam member 47. In a typical example the flexible foam 47 has a thickness as of 0.250 to 0.750 inches. In the case where the flexible foam 47 is of the open cell type the envelope 48 may be filled with water to reduce the buoyancy of the panels 13 thereby reducing the requirements on the size of the ballast 19 and the size of the bladder 18. The water trapped in the open cell foam 47 has only negligible influence on the thermal insulative properties of the foam 47 since the water is trapped in the foam structure.

Referring now to FIGS. 15 and 16 there is shown an alternative panel structure of the present invention wherein the panels 13 are made of a rigid foam material, as of polystyrene. The bladder portion 18 of the sinking structure 17 is joined along the active hinge line 14' by being secured along the top of adjacent side edges of panel 13. In a typical example, the bladder includes a vertical flange portion 49 which passes in between adjacent rigid panels 13 and terminates in a cross flange portion 51 secured to the top of the adjacent panels 13 via adhesive at 52. When the bladder 18 is deflated, the downward force at the hinge joint 14 causes the adjacent panels to tilt upwardly. The pliable flange portion 51 bends back on itself allowing the adjacent panels 13 to tilt. The non-active hinge joints for the rigid panels 13 is shown in FIG. 16 and comprises a pliable sheet 53 cemented over the crack 54 between adjacent rigid panels 13. A cover flange or seal 55 is secured to one of the panels 13 and has a free lip portion 56 extending over the crack 54 and the marginal edge of the adjoining panel 13 to prevent debris from collecting in the joint 54 between the adjacent panels 13. The hinge joint 14, formed in the structure of FIG. 16, allows the rigid panels to fold in the opposite sense to the active joint 14' shown in FIG. 15.

As thus far described, pneumatic means have been provided for folding and unfolding the cover structure 12 to open and close the swimming region of the covered pool. While the pneumatic actuating means comprises the preferred embodiment, it is also possible to substitute a mechanical sinking means for the pneumatic sinking means. More particularly, as shown in FIGS. 17 and 18, the cover 12 may comprise a plurality of laterally directed panels 13 joined together by laterally directed hinges. The panels 13 may be rigid or flexible. A plurality of pulleys 56 are connected to alternate lateral hinge joints 14' via a suitable bridle. A pulley 57 is affixed near the bottom of the pool in the deep end thereof and a line 58 is affixed to the end pulley 56'. The line 58 passes over the top of the remaining pulleys 56 and around the bottom of the submerged pulley 57 to a takeup means such as a winch, not shown, on the pool deck. The operator actuates the winch to takeup on line 58 causing the active hinge joints 14' affixed to the pulleys 56 via the bridles to be submerged as shown in FIG. 18 for retracting and folding the cover 12 within the pool to clear a region for swimming.

The advantage of the pool cover 12 of the present invention is that it provides a truly effective and efficient thermally insulative cover for the pool for retaining the heat within the pool when the pool is not in use. At the same time in certain embodiments utilizing transparent or translucent thermally insulative covers the asthetic appearance of the pool is retained. The cover does not unduly interfere with normal pool cleaning device such that that debris which does enter the pool can be cleaned in the conventional manner. At the same time an automatic system is provided for opening and closing a substantial region of the pool for swimming. The pool cover is readily removed in the summer, if desired, by detaching the ballast and then folding the cover for storage. In this regard, the spacing member 16 which is employed for tethering the edge of the cover to the pool may be detachably secured to the lip of the pool, as by screws passing into members more permanently affixed to the lip of the pool as by adhesive.

In the case of rigid panels 13 in a non-rectangular pool, the end portions of the panels 13 are preferably made of a flexible panel portion, as of flexible plastic foam, to enable the flexible end portions to deform to the curved contour of the pool edge at the opposite ends of the pool as the folded panels are laterally retracted against the lateral sides of the pool.

Also, the lateral extending inflation and deflation tubulation need not be separate from the bladders 18 but in a preferred embodiment, tubulation 28 connects into the bladder 18 nearest the side of the pool at any convenient point such as midway along the length thereof. Additional short lateral tubular segments are provided interconnecting adjacent bladder 18 at the shallow end of the pool such that debris caught on the top of the cover 12 is dumped toward the deep end of the pool where it is most easily collected by the main drain. This dumping action takes place because the cover 12 sinks first and raises last at the end of the cover 12 which is most remote from the inflation and deflation tubulation 28.

Referring now to FIG. 19, there is shown an alternative embodiment of the present invention. In this embodiment, additional positive buoyancy is provided at the lip of the cover 12 by providing a hollow tubular channel 61 at the lip of the cover 12, such channel including an inflatable bladder 62 extending around the periphery of the cover at the lip thereof. Inflation of the bladder 62, as derived from the air compressor or air pump 31 and line 28, serves to inflate the bladder 62 when the cover 12 is to be extended for covering the pool. In addition, inflation of the bladder 62 serves to force the outer lip portion of the cover 12 up against the wall of the pool to aid in sealing the cover to the pool. The additional positive buoyancy at the lip is provided so that an object or a person falling upon or otherwise tending to depress the lip of the cover 12 is more fully supported to prevent such object or person from falling beneath the cover at the lip thereof. The bladder 62 and the hollow channel lip portion 61 preferably extend substantially entirely around the periphery of the cover except in that region which would be adjacent the skimmer 63 (see FIG. 21) so that a flow of pool water into the skimmer 63 over the top of the cover is facilitated.

In addition, the channel portion 61 at the lip of the cover 13 may include an array of openings 64 communicating with a pool water distribution manifold 65 provided on the inside of the hollow lip 61 and formed by sealing a sheet of plastic 66 to the inside wall of the channel 61 along opposite marginal side edges of the array of openings 64. A pool water conduit 67, preferably connected to the output of the pool water circulation pump 86, filter 87, and heater 89, serves when actuated via a valve 68 to return the pool water over the top of the cover 12 so as to flush dirt and debris collected on the upper surface of the cover into the skimmer 63. Valve 68 is solenoid operated from a timer inside the controller 84 so that the top of the cover is flushed during a certain predetermined portion of the day or night.

When the cover 12 is being flushed with pool water, the water level on top of the cover 12 can build up to a substantial depth because the inflated lip 61 provides an overall positive buoyancy for the cover. The cover is preferably weighted or otherwise arranged so that the cover 12 slopes toward the skimmer drain 63 so that the flushing water flows to the skimmer. The lowest or more heavily weighted portion of the cover is adjacent the skimmer to provide the lowest portion thereof. The weighting of the cover to provide the flow path to the skimmer 63 is shown in FIG. 22.

An air or gas permeable structure such as a wire helix 71 is contained within and is substantially axially coextensive of the bladder 62 to prevent the bladder 62 from being fully collapsed when deflated and sunk below the water level of the pool as occurs during folding of the cover 12. The helix is preferably terminated at one end on a "T" fitting 72 utilized to feed the air into the bladder 62, as shown in FIG. 20, so that the inside of the helix is in good gas communication with the "T" fitting 72.

The bladders 62 are conveniently secured to the "T" fitting 72 via hose clamps 73 which bear on a flexible collar 74, as of fiber-reinforced rubber, which in-turn serves to clamp the open end of the bladder 62 around the transverse end portion of the "T" fitting 72 to form a fluid-tight seal thereto. Air is pumped to and from the bladder 62 via a reversible air pump 31 for inflating and deflating the bladders 62. This same arrangement is employed for inflating and deflating bladders 18 of the previous embodiments.

In an alternative embodiment, which does not have to be partially sunk, the lip portion of increased positive buoyancy merely comprises a solid foam cylindrical member extending around the lip of the cover 12 and being secured thereto.

Referring now to FIGS. 21-23 there is shown a solar heating embodiment of the pool cover of the present invention. In the embodiment of FIGS. 21 and 22 the buoyant pool cover material 12 which, in a preferred embodiment may comprise two-pound per cubic foot polyethylene foam within the range of thickness of $\frac{1}{8}$" to $\frac{3}{4}$" and preferably $\frac{1}{4}$" in thickness. Also, the buoyant cover material 12 may comprise a sheet of expanded foam rubber such as Hypalon rubber which is particularly resistant to damage by ultraviolet radiation. Also, in the case of polyethylene and other plastics, the foam plastic material preferably includes UV inhibitors or is coated with a UV inhibitor material such as Hypalon rubber or liquid urethane rubber.

In one embodiment of the combined solar heater and pool cover, the top surface of the pool cover foam material 12 includes a cover sheet 74 which is sealed to the upper surface of the plastic foam 12, as by heat sealing, along certain seam lines 75 to define a plurality of generally parallel pool water passageways 76 through which the pool water is circulated for solar heating thereof. In one embodiment, the plastic sheet 74 is made of a solar energy translucent material so that the solar energy passes through the cover sheet 74 into the pool liquid stream. Solar energy which is not absorbed directly in the pool water stream is absorbed by the upper surface of the plastic foam sheet 12 for conversion into thermal energy which is in thermal exchanging relation with the pool water circulating therethrough for heating thereof.

An input water distribution manifold 77 is conveniently formed at the upstream end of the solar heating channels 76 by sealing a sheet of plastic 78 along marginal side lip portions 79 to the underside of the plastic foam sheet 12 on opposite sides of an array of water distribution holes 81 communicating through the plastic foam sheet 12 to the channels 76 on the upper side thereof. As an alternative, pool water is brought into a similar manifold formed by heat sealing of the cover sheet 74 on top of the cover 12, in which case the holes 81 are eliminated.

Pool water is brought into the manifold 77 via input line 82. The circulation of pool water through line 82 is controlled via a valve 83 operatively connected to an output of a controller and solar heat sensor 84 which senses when the solar heating conditions are proper for solar heating and opens the valve 83 and closes the return valve 86 so that a substantial portion of the return pool water is circulated through the solar heating panel. At the downstream end of the solar heating channel 76, an array of openings 85 communicate with the channels 76 through the foam cover 12 to the pool below the cover. Water to be circulated through the solar heater can be picked up at the skimmer 63 or from the main drain and pumped via the pool circulation pump 86, filter 87, and pool heater 88 to pool return lines 67, 82 and 89 in accordance with the setting of valves 68 and 83.

Weights 91, as of concrete, are carried in pockets 92 formed in the bottom side of the buoyant cover 12 by being captured within a saddle 93, as of sheet plastic, sealed to the bottom of the cover 12 along marginal side lip portions. The weights 91 serve to load the cover with a certain degree of negative buoyancy to cause the cover to slope toward the skimmer 63 for causing a flow or stream of pool water pumped over the top of the cover to flow toward the skimmer for cleaning of the pool cover in use.

The sheet of plastic or other material serving as the cover for the water channels 76, in one embodiment, is made of a solar energy translucent material, such as clear polyethylene or clear polyvinylchloride, and the upper surface of the foam cover layer 12 at 94 is preferably coated with a solar energy absorbing layer, as of dark blue or black Hypalon rubber, so that the radiant energy passes through the translucent cover or window portion 74 into the water channels 76 and to the dark layer 94.

In an alternative embodiment, the cover layer 74 is made of a dark solar energy absorbing material, as of Hypalon rubber or of black plastic such as polyethylene or polyvinylchloride, such that the solar radiant energy is absorbed in the layer 74 and the thermal energy is transferred therethrough to the coolant channels 76. In this latter embodiment, the plastic sheet material 74 is preferably made of a UV resistant material. One advantage of this latter embodiment is that it serves to protect the foam cover 12 from UV damage.

Referring now to FIG. 24 there is shown an alternative negative buoyancy weight embodiment of the present invention. A hollow cylindrical weight 97, as of concrete, is carried within a saddle 98 formed by a channel of plastic material, as of polyethylene foam or polyethylene or polyvinylchloride sheet, which is sealed along a fold line 14' to the bottom side of the foam cover 12 at 99. The saddle 98 is transversely segmented at approximately one foot intervals with one inch spacing therebetween along the length thereof to accommodate approximately one foot lengths of the hollow cylindrical weight 97.

The inside to outside diameter of the hollow weight 97 is dimensioned so that annular concrete portion of the weight provides sufficient negative buoyancy per linear foot for sinking the required number of square feet of the cover 12 to be sunk by the individual weight. However, the ratio of the inside to outside diameter of the hollow cylindrical weight 97 is chosen so that when the hollow interior of the weight is fully occupied by the inflated bladder 62 the positive buoyancy of the bladder 62 will overcome the negative buoyancy of the weight 97 to provide substantial total neutral buoyancy for the weight 97 including the saddle 98 if such saddle has positive buoyancy. In a typical example, assuming the concrete has a density of 129 pounds per cubic foot and that the water has a density of approximately 65 pounds per cubic foot and neglecting the positive buoyancy, if any, of the saddle the outside radius $r_o$ of the weight 97 is equal to 1.414 times the inside radius $r_i$. In addition, the negative buoyancy of the weight in pounds is equal to the inside radius $r_i$ squared times 1.416 where the inside radius $r_i$ is in inches. Concrete having a composition by volume of two parts concrete powder to two parts fine sand to one part water has a density of approximately 129 pounds per cubic foot.

In case the positive buoyancy provided by the bladder 62 is slightly in excees of that to achieve neutral buoyancy, the neutral buoyancy may be trimmed by reducing the positive buoyancy of the inflated bladder 62 by inserting an open ended trim tube 101 into the hollow interior of the weight for displacing a portion of the bladder 62. If the weight 97 is excessive and sinks too much of the cover material, the amount of the weight can be reduced by forming the weight with annular notches 102 on the interior or exterior thereof at convenient intervals of length as of one to two inch axial spacing. A selected portion of the weight may be broken off from the main body of the weight by fracturing the weight in registration with a selected one of the notches 102.

Referring now to FIG. 26 there is shown a method for making a template to the precise shape of the pool to be covered. More particularly, a thin translucent film 104 and preferably transparent, as of 0.0003–0.003 inch think polyethylene film is first rolled onto an inflated spoot 105 provided by inflation of a tubular plastic member as of 0.010 inch thick polyvinylchloride sheet material formed by heat sealing into a tubular shape. The inflated spool 105, after the translucent film is wound thereon, is deflated for easy folding and storage. When it is desired to roll out the translucent film, which is to form the template, over the pool, the deflated spool 105 is inflated and disposed across the pool. As the spool 105 is rolled across the pool for unrolling the translucent film, weights 103, such as water filled sections of 0.006 inch thick five inch diameter plastic tubing, are laid out for weighting the edge of the film 104 for holding same in the desired position. After the film 104 has been positioned and tightened over the pool, the border of the pool is marked on the translucent film by means of an indelible marking pen. In addition, other items of interest are marked on the film such as the location of the skimmer, inlet and outlet pipes and depth of the pool at the shallow end including such things as stairs, etc.

After marking of the translucent template 104, the film is again wound back on the inflated spoot 105, deflated and sent to a site for fabrication of the pool cover. While the translucent film is being unrolled over the surface of the pool it is often desirable to feed a stream of air in under the film to prevent the film from sagging into the water of the pool where surface tension can deleteriously affect proper handling of the template.

What is claimed is:

1. The method for selectively covering and uncovering a region of a swimming pool comprising the steps of:

floating a bendable thermally insulative sheet-shaped cover in a swimming pool for covering a region thereof;

selectively applying a sinking force to a sinkable first portion of said cover to sink said first portion to a lower level in the pool liquid than a second portion of the cover, said second portion having a positive buoyancy to cause the positively buoyant second portion to have an upwardly directed force exerted thereon which is opposite to the force producing the sinking of said first portion of the cover to cause the cover to bend and thus to be folded within the pool, thereby uncovering a region of the pool for swimming.

2. The method of claim 1 wherein the step of selectively applying a sinking force to a sinkable portion of said cover includes the step of decreasing a volume of air operatively coupled to said sinkable portion of said cover for reducing the positive buoyancy of said sinkable portion to cause said sinkable portion to sink.

* * * * *